Dec. 2, 1952  S. B. DOMBROWSKI  2,619,686
BUILDING CONSTRUCTION
Filed May 22, 1947

INVENTOR
STANLEY B. DOMBROWSKI
BY
Raymond A. Thomas
ATTORNEY

Patented Dec. 2, 1952

2,619,686

UNITED STATES PATENT OFFICE 2,619,686

BUILDING CONSTRUCTION

Stanley B. Dombrowski, Detroit, Mich.

Application May 22, 1947, Serial No. 749,738

1 Claim. (Cl. 20—4)

This invention relates to an improved building construction and, in particular, it relates to means for joining together a plurality of parallel assembled building elements. More particularly, the invention relates to a means for joining parallel disposed logs, or building elements, together in the formation of structures, such as log cabins.

In general, my invention comprises a structure in which two or more logs, or building elements, are assembled together in parallel relationship by means of a thin strip of metal which fits into saw slots formed longitudinally of the logs.

It is recognized that, heretofore, certain structures have been assembled by providing wood tungs or wood strips which fit into complementary longitudinal openings in assembled logs, or building elements. However, in these prior structures, the use of wood dividing or key strips are objectionable in several respects. In the first place, it is essential that the strips themselves, in order to provide structural stability, must be of substantial thickness. It is also essential that the strips be planed to an exact thickness and that the grooves in the logs be cut to a correspondingly accurate width. Still further, the use of wood key strips is objectionable, because any swelling, shrinking, or cracking of the strip results in inadequate or difficult assembly with the slot provided in the log.

An advantage of my invention is that the use of a thin metal joining strip merely requires that a saw slot be formed longitudinally of the log, or building unit, with which the strip is associated. This makes it possible to cut the slot in the logs at location by means of a conventional and hand-operated power saw; thus eliminating expensive mill work and hauling the materials to and from the mill.

Another object of my invention is that the use of thin metal joining strips makes it possible to join logs or building units regardless of their thickness, and regardless of the angle of their assembly. For example, whole logs may be used as well as half or split logs, standard thickness boards and even plywood. Even more important is the permissible and efficient usage of common saw mill slabs. As a general rule, these slabs are not suitable for building structures having the appearance of log cabins, because the slabs are not thick enough to permit heretofore conventional means for joining the slabs together. The use of metal strips requires a saw slot of only about $\frac{1}{16}$ inch, with the result that the slots may be formed along the sides of relatively thin slabs. This permits the use of materials which otherwise are not suitable for log cabins, thus resulting in substantial economies in this type of building structure.

Where the use of thin metal strips are employed, according to my invention, the narrow saw slot along the edges of the split log, or log slab, or boards, removes such little material from the unit that it does not materially reduce the strength of the unit. In conventional methods, where wide slots are formed in the unit, it frequently results in the removal of so much material that failures sometimes occur because of the thin wall which remains adjacent to the slot.

Another advantage of my invention is that the metal strip may be made longer than the length of the log, or unit, with which it is used. For example, when the logs are used vertically the slots may be formed in the upper and lower plates associated with the logs, thereby permitting the additional length of the metal strip to fit into the slot in the upper and lower plates. In this manner, the building unit is completely locked in place at both its sides and ends without the use of any nails or other fastening means.

A further feature of the invention is that the sheet metal strips are bendable, which makes it possible after the strips are assembled with the logs to shape the assembly to form a wall of irregular contour, or a curved wall such as used for bay windows, dormers, gables, and the like. An arrangement of this kind is not possible where rigid material is used to constitute the joining member.

Other advantages are that the metal may be prepainted, or otherwise treated, so as to effect the appearance of plaster, or clay, such as used in the original assembly of log cabins. Plain materials may be used, such as strip aluminum which, in its natural condition, exhibits a whitish appearance resembling plaster, or clay.

A further advantage in the use of metal strip material as the joining medium is that the metal may be perforated, or be otherwise split or indented, like metal lath, to provide a locking means against which plaster, clay, or other sealing compounds may adhere. This is an important provision because the plaster or other sealing medium used between logs frequently dries up and falls out of its associated location. The use of a perforated metal strip provides a locking condition which permanently associates the sealing material with the logs.

These and other objects and advantages will appear more fully in the following detailed description when considered in connection with the accompanying drawing, in which.

Figure 1:
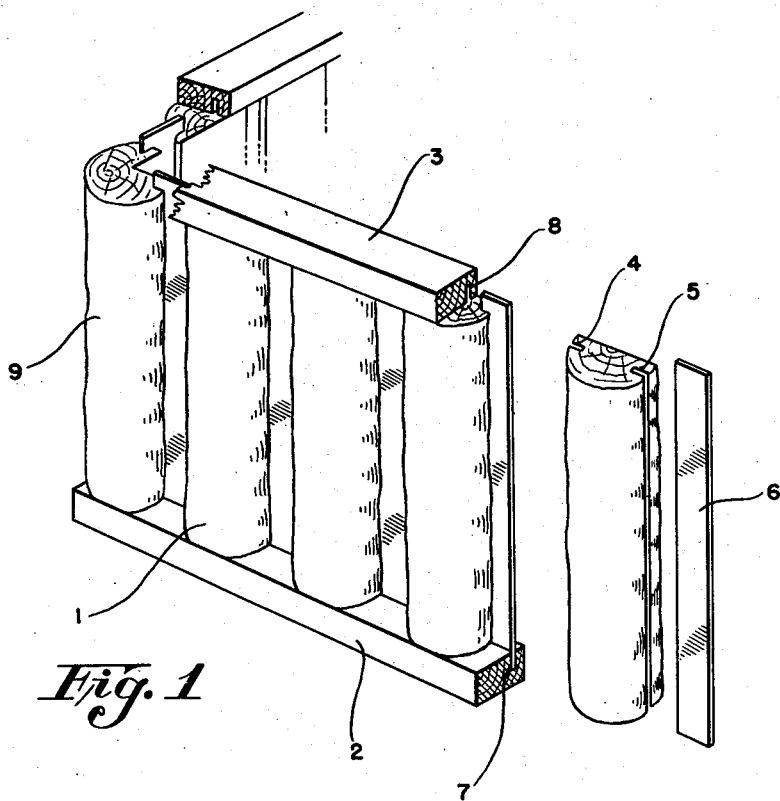
Figure 1 is a perspective view, partly in section, partly broken away, and partly in exploded view, illustrating an embodiment of my invention.

With reference to the drawing and, in particular, to Figure 1, I show an embodiment of my invention in the form of vertically extending log members 1 resting upon a lower plate 2 and supported by a top plate 3. Each of the principal log members is provided with slots 4 and 5 extending lengthwise of the logs in a diametrically opposed position. These slots 4 and 5 are of a width representing approximately the thickness of a conventional saw. Preferably, the slot should be approximately 1/16 of an inch in width, or it may lie within the range of 3/32 inch to 1/8 inch. The depth of the slot may be within the range of from 1/2 inch to 1 1/4 inch, preferably 1 inch.

Adapted for insertion in the slot 4 or 5 is a key strip 6. This strip is formed of metal having a thickness equivalent to the width of the slot, that is from 3/32 inch to 1/8 inch with a preferable thickness of 1/16 inch. The width of the strip 6 should be sufficient to join the logs together and, if desirable, to allow a space between the logs. A satisfactory width of the strip for this purpose is from 1 1/2 inches to 4 inches.

In composition, the strip 6 is formed of metal, such as sheet steel. Aluminum, or an alloy metal, may also be used as a substitute for the sheet steel, some of which possess a whitish color inherently. If desirable, the metal may be coated or otherwise treated to resist oxidation or corrosion. In some cases, it is desirable to paint at least one side of the strip a color, such as white. Without any further treatment, this white color gives the appearance of plaster or clay used as a sealing material between the logs.

The strip material 6 may be utilized in strip form, or it may be taken from a roll of material and cut to the desired lengths. When assembling the strip 6 with the log 1, it is merely necessary to press the strip firmly into the slot, such as 4 or 5. Because the strip 6 is relatively thin and the slots in the log are of a corresponding approximate size, the strips fit into the slot snugly and provide a substantially weather tight seal.

The strip 6 may be cut slightly longer than the length of the logs 1, while slots 7 and 8 may be formed in the plates 2 and 3, respectively. By this arrangement, the metal strip 6 not only functions to join one log to an adjacent log, but it also functions, due to its increased length, to engage in the slots 7 and 8 of the plates 2 and 3, respectively, thereby locking the ends of the logs with the upper and lower plates. Consequently, it is not necessary to utilize nails, or other means of fastening, by this method of assembly. As a result, a structure may be erected easily and quickly and economically, and better appearing. An arrangement such as I have provided permits the units to be either cut to proper length and slotted at the mill, or at the location of fabrication. While the log 1 is shown substantially as a half log, or a split log, it is to be understood that other log members may be equally adaptable. For example, a corner log 9 may be used which forms a complete log with a 90 degree longitudinal cut therein.

Figure 2:
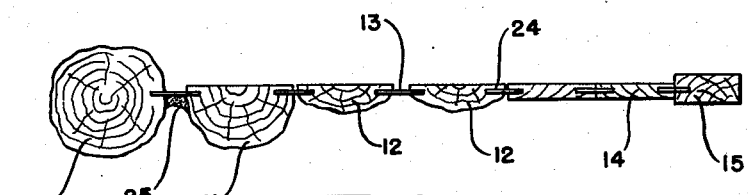
Figure 2 is a plan view illustrating various building elements associated together in accordance with my invention.

Other forms of logs are shown in Figure 2 wherein is illustrated a complete log 10, a one-half or split log 11, and log slabs 12. The slabs 12 usually comprise the outermost discarded portion of a log which is milled in the lumbering process. The log slabs 12 are usually discarded and appropriated for fire wood, or pulp wood. Because the log slabs are relatively thin they are not ordinarily applicable for log cabin structures. However, since the thin sheet metal key member, such as 1e, requires very little thickness of its associated log members, the slabs 12 are equally adaptable as half logs, or other log portions.

In addition to log members, planed or finished lumber, such as strips 14 or 15, may also be used, and also plywood. In each case, a groove or saw slot 14 is formed in the longitudinal edge of the wood member for accommodating the key strip 13. If desirable, plaster, clay, or other sealing material 15 may be applied between the logs and against the key strip 13.

Figure 3:
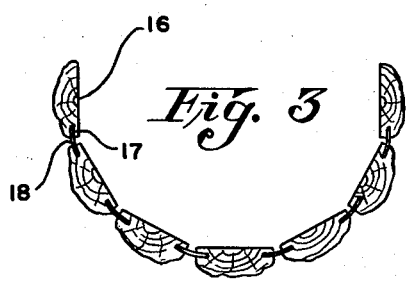
Figure 3 is a plan view of a plurality of log slabs joined together and shaped to form a curved wall.
Figure 4:
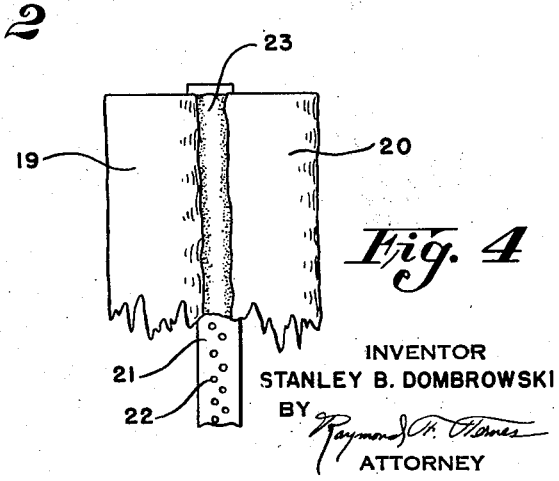
Figure 4 is a side elevational view of a portion of a log assembly illustrating a perforated metal joining strip adapted for locking a sealing material therewith.

One of the particular advantages of my invention is that the key strip being of sheet metal are longitudinally bendable. As an example of this condition I show a modification of my invention, illustrated in Figure 3, in the form of a bay, or other circular or angular part of a building structure. Essentially, this bay comprises a plurality of log slabs 16, each of which is provided with saw slots along the longitudinal edges thereof. A metal strip 18, similar to that described as character 6 in Figure 1, is used as a key member for joining the log slabs longitudinally together. After a plurality of such log slabs are so joined together, the entire structure may be bent to form a bay, dormer, gable, curve, arch, or other irregular wall surface, and the assembly thereafter permanently secure in the desired shape. During this bending operation, the metal strips 18 become actually bent, thus making the curved structure permissible. If desirable, the strips may be bent before assembly.

As a further modification of my invention, I show a pair of log members 19 and 20 joined together by a metal key strip 21. The key strip contains a plurality of perforations 22, or other indentations, or split metal, such as a conventional expanding metal lath. Because of these perforations 22, plaster, clay, or other sealing materials, may be applied between the logs and against the metal strip 21 where the material becomes locked in the perforations 23. This results in a permanent adhesion and prevents the sealing material from otherwise falling away from its proper location.

As thus shown and described, it is believed apparent that I have provided a novel construction in the formation of log cabins, and other building structures, and for associating building materials together in which efficiency, economy, and flexibility of fabrication represents a substantial advance in the art.

While I have shown and described a preferred embodiment of my invention, it is to be understood that it is susceptible of those modifications which appear obviously within the spirit of my invention and as appearing in the scope of the appended claim.

Having thus described my invention, what I claim and desire to protect by Letters Patent is:

In a building structure a wall comprising, a plurality of wooden members positioned in side by side and spaced relationship, said wooden members having a saw slot extending along each adjacent edge of the member, and a single metal strip fitting in the saw slot and having a length equal to at least the length of the wooden member, a sealing composition applied between the wooden members, said metal strip having perforations therethru supporting and retaining said sealing composition, whereby the wooden members are longitudinally joined together.

STANLEY B. DOMBROWSKI.

REFERENCES CITED

The following references are of record in the file of this patent:

UNITED STATES PATENTS

| Number | Name | Date |
|---|---|---|
| 198,926 | Boyd | Jan. 8, 1878 |
| 341,735 | Densmore | May 11, 1886 |
| 1,445,738 | Adams | Feb. 20, 1923 |
| 1,996,735 | King | Apr. 2, 1935 |
| 2,208,671 | Gerber | July 23, 1940 |
| 2,320,466 | Presley | June 1, 1943 |
| 2,416,162 | Drake | Feb. 18, 1947 |

FOREIGN PATENTS

| Number | Country | Date |
|---|---|---|
| 435,699 | Germany | 1926 |
| 163,464 | Switzerland | 1933 |